United States Patent
Iaquaniello et al.

(10) Patent No.: US 11,724,936 B2
(45) Date of Patent: Aug. 15, 2023

(54) CATALYST FOR LOW TEMPERATURE ETHANOL STEAM REFORMING AND RELATED PROCESS

(71) Applicant: KT—KINETICS TECHNOLOGY S.P.A., Rome (IT)

(72) Inventors: Gaetano Iaquaniello, Rome (IT); Emma Palo, Battipaglia (IT); Vincenzo Palma, Castellammare di Stabia (IT); Antonio Ricca, Luogosano (IT); Concetta Ruocco, Scafati (IT)

(73) Assignee: KT—KINETICS TECHNOLOGY S.P.A., Rome (IT)

( * ) Notice: Subject to any disclaimer, the term of this patent is extended or adjusted under 35 U.S.C. 154(b) by 817 days.

(21) Appl. No.: 16/306,491

(22) PCT Filed: May 31, 2016

(86) PCT No.: PCT/IT2016/000141
§ 371 (c)(1),
(2) Date: Nov. 30, 2018

(87) PCT Pub. No.: WO2017/208269
PCT Pub. Date: Dec. 7, 2017

(65) Prior Publication Data
US 2019/0127220 A1    May 2, 2019

(51) Int. Cl.
*C01B 3/32* (2006.01)
*B01J 37/02* (2006.01)
(Continued)

(52) U.S. Cl.
CPC ............. *C01B 3/326* (2013.01); *B01J 23/002* (2013.01); *B01J 23/8946* (2013.01);
(Continued)

(58) Field of Classification Search
CPC ...................................... C01B 3/326
See application file for complete search history.

(56) References Cited

U.S. PATENT DOCUMENTS

2005/0260123 A1* 11/2005 Deluga ............... B01J 35/0006
423/652
2007/0167323 A1* 7/2007 Kobayashi ............ B01J 23/462
502/341
(Continued)

FOREIGN PATENT DOCUMENTS

EP      2527292 A1    11/2012
WO   WO 2014/078119 A1    5/2014

OTHER PUBLICATIONS

International Search Report and Written Opinion issued by International Searching Authority in corresponding International Application No. PCT/IT2016/000141, dated Feb. 20, 2017(PCT/ISA/210 & PCT/ISA/237).
(Continued)

*Primary Examiner* — Paul A Wartalowicz
(74) *Attorney, Agent, or Firm* — ArentFox Schiff LLP

(57) ABSTRACT

A catalyst composition suitable for the ethanol reforming process at low temperature with enhanced stability on long term, comprises a noble metal, such as platinum or rhodium, and a transition non-noble metal, such as nickel or cobalt, supported by a carrier comprising, cerium, zirconium, optionally aluminium, supplemented with potassium. It is provided also a method for the stable production of hydrogen from an ethanol containing gas stream, comprising subjecting the gas stream to catalytic ethanol reforming as to form a rich H2 stream, using the catalyst as defined above.

21 Claims, 2 Drawing Sheets

(51) Int. Cl.
  *B01J 23/89* (2006.01)
  *B01J 37/18* (2006.01)
  *C01B 3/48* (2006.01)
  *B01J 23/00* (2006.01)
  *C01B 3/34* (2006.01)
  *B01J 37/08* (2006.01)
  *C01B 3/38* (2006.01)

(52) U.S. Cl.
  CPC ....... *B01J 37/0205* (2013.01); *B01J 37/0236* (2013.01); *B01J 37/08* (2013.01); *B01J 37/18* (2013.01); *C01B 3/34* (2013.01); *C01B 3/38* (2013.01); *C01B 3/48* (2013.01); *B01J 2523/00* (2013.01); *C01B 2203/0233* (2013.01); *C01B 2203/0283* (2013.01); *C01B 2203/043* (2013.01); *C01B 2203/107* (2013.01); *C01B 2203/1052* (2013.01); *C01B 2203/1058* (2013.01); *C01B 2203/1064* (2013.01); *C01B 2203/1082* (2013.01); *C01B 2203/1229* (2013.01); *C01B 2203/1241* (2013.01); *C01B 2203/142* (2013.01); *Y02P 20/52* (2015.11)

(56) References Cited

U.S. PATENT DOCUMENTS

2010/0178219 A1* 7/2010 Verykios ................. B01J 4/002
  422/621
2010/0298131 A1 11/2010 Ni et al.
2012/0028794 A1* 2/2012 Lam ........................ C01B 3/326
  502/303

OTHER PUBLICATIONS

Palma et al., "Ethanol steam reforming over bimetallic coated ceramic foams: Effect of reactor configuration and catalytic support", International Journal of Hydrogen Energy, vol. 40, (2015), pp. 12650-12662.

Palma et al., "Hydrogen production through catalytic low-temperature bio-ethanol steam reforming", Clean Technologies and Environmental Policy, vol. 14, (2012), pp. 973-987, DOI: 10.1007/s10098-012-0472-7.

Pereira et al., "H2 production by oxidative steam reforming of ethanol over K promoted Co—Rh/CeO2—ZrO2 catalysts", Energy and Environmental Science, vol. 3, (2010), pp. 487-493.

* cited by examiner

CATALYST FOR LOW TEMPERATURE ETHANOL STEAM REFORMING AND RELATED PROCESS

CROSS-REFERENCE TO RELATED APPLICATIONS

This application is a National Stage entry of International Application No.: PCT/IT2016/000141, filed May 31, 2016. The disclosures of the priority applications are hereby incorporated in their entirety by reference.

FIELD OF THE INNOVATION

The invention pertains to a catalyst suitable for the reaction of ethanol steam reforming characterised by high activity at low temperature and enhanced stability towards chemical deactivation owing to coke formation. The invention also refers to a method of producing said ethanol steam reforming catalyst.

BACKGROUND ART OF THE INNOVATION

The shortage of hydrocarbon-based energy reserves and the environmental concerns rising from fossil fuels use is pushing to the development of sustainable chemical processes based on the deployment of renewable sources. Clean hydrogen production and utilization is expected to become a feasible solution for a decarbonised energy production [1].

Currently, $H_2$ is mainly generated via methane steam reforming (Eq. 1). However, in order to exploit the maturity of reforming technology and, at the same time, limit pollution-related problems, ethanol reforming is regarded as a promising route for hydrogen production.

$$CH_4 + H_2O \leftrightarrow 3H_2 + CO \quad \text{(Eq. 1)}$$

Bio-ethanol (namely ethanol produced from biomass) as hydrogen source has several benefits; for example, it assures $CO_2$-emission neutrality (the carbon dioxide produced by ethanol conversion will be consumed during biomass growth) and such aqueous solution (10-18 wt % of ethanol in water [2]) can be directly employed for steam reforming, thus avoiding the expensive costs for water separation and increasing the overall energy efficiency of the process Typical routes for hydrogen production from ethanol include steam reforming, partial oxidation and oxidative steam reforming. Ethanol steam reforming (Eq. 2) can potentially produce a high hydrogen amount per mole of converted reactant with no by-products formation other than carbon dioxide (according to the stoichiometry, 6 mol of $H_2$ with respect to 1 mol of $C_2H_5OH$ reacted).

$$C_2H_5OH + 3H_2O \leftrightarrow 6H_2 + 2CO_2 \quad \text{(Eq. 2)}$$

Under a thermodynamic point of view, high temperatures and steam/ethanol molar ratios promote $H_2$ yield: 5.1 ($mol_{H2}/mol_{C2H5OH}$) of hydrogen yield can be reached at 700° C. and steam to ethanol ratio of 6. On the other hand, moderate temperature and high water content in the reforming mixture can limit carbon monoxide formation, thus avoiding its easy conversion to coke through Boudouard reaction (Eq. 6). Moreover, a reduced content of carbon monoxide in the downstream gas can result in lower impact of further purification stages (e.g. water gas shift unit (Eq. 4)). Energy balance on the system evidenced that at high temperatures the contribution of steam reforming reactions results in a marked increasing of overall enthalpy, enhancing process endothermicity. On the other hand, at lower temperature, the exothermic contribution of water gas shift (Eq. 4) and methanation (Eq. 5) reactions reduces the external heat supply and the overall energy penalty; the auto-thermal point ($T_{react}=T_{prod}$), at which the system is completely thermally self-sustained, depends on feed ratios steam/ethanol and operating pressure.

$$2CO \leftrightarrow CO_2 + C \quad \text{(3)}$$

$$CO + H_2O \leftrightarrow CO_2 + H_2 \quad \text{(4)}$$

$$CO + 3H_2O \leftrightarrow CH_4 + H_2O \quad \text{(5)}$$

The typical products distribution of ethanol steam reforming reaction, according to thermodynamic evaluations, results in considerable hydrogen production rates above 500° C. and high methane yields at T<450° C. (FIG. 1).

However, depending on the selected operating conditions (temperature, ethanol partial pressure, steam to ethanol molar ratio, space velocity) and the used catalyst, different reaction pathways can be observed, which reduce the desired product selectivity. In particular, the easy transformation of ethanol to acetaldehyde, ethylene, acetone or other by-products through decomposition (not considered in FIG. 1), dehydrogenation and dehydration reaction strongly affects $H_2$ yields, but above all could represent precursors for carbonaceous compounds that, depositing on the catalyst, determine its irreversible deactivation, and accordingly limiting the application of the process at industrial level.

The main pathways responsible for coke deposition include methane decomposition (Eq. 6), Boudouard reaction (Eq. 3) and ethylene polymerization (Eq. 7) [3]. Alternatively, carbon formation from ethylene could occur through decomposition followed by accumulation and polymerization of carbon atoms (Eq. 8).

$$CH_4 \leftrightarrow 2H_2 + C \quad \text{(Eq. 6)}$$

$$C_2H_4 \rightarrow \text{polymers} \rightarrow \text{coke} \quad \text{(Eq. 7)}$$

$$C_2H_4 \rightarrow 2C + 2H_2 \rightarrow \text{coke} \quad \text{(Eq. 8)}$$

Low reaction temperatures generally favour the Boudouard mechanism while (Eq. 6) is the main route at high temperatures. Moreover, depending on the reaction temperature, both amorphous and graphitized carbon can be produced.

Accordingly, there is a big interest in the literature in finding a way to enhance the stability of the catalyst. Furthermore, it was also evidenced that the properly modulation of operating conditions may represent an interesting route for stability performances improvement. For $Ni/SiO_2$ catalysts [4], it was shown that the increase in contact time and steam/ethanol molar feed ratio as well as the lower ethanol partial pressure involve a decrease in carbon formation rate. On the other hand, carbon accumulation is promoted at low temperatures over $Ni/CaO-ZrO_2$ catalysts [5]. It is also worthwhile noting that oxygen co-feeding may enhance the contribution of carbonaceous oxidation reactions.

However, under an industrial point of view, operating conditions are affected by several parameters. On the basis of the previous considerations and taking into account that the proper temperature selection may assure a considerable reduction of external thermal duty and overall energy penalty, the opportunity of performing ethanol steam reforming at T<600° C. appears very promising. However, the choice of carrying out steam reforming reaction in the low-temperature and/or high pressure ranges (to exploit exothermic reactions) may negatively effect on catalyst stability due to coking phenomena. On the other hand, excess water operations, despite can minimize carbon selectivity, involve a sensible growth in plant variable operating costs. Therefore, the main challenge of ethanol reforming process intensification lies in the development of active at low-temperature and coke-resistant catalysts.

Several noble (Pt, Pd, Ru, Rh, Ir)/non-noble (Co, Ni) metals supported on different oxides [1] as well as more complex formulations (including perovskites) were reported as suitable catalysts for ethanol steam reforming reaction. For example, nickel in metallic state $Ni^0$ promotes the breaking of different bonds in ethanol molecule in the following order: O—H, —$CH_2$—, C—C, —$CH_3$. Also Co-based catalysts are active towards carbon-carbon bonds rupture. On the other hand, noble metals, besides promoting water gas shift reaction, also improve catalysts long term stability due to the conversion of coke precursors to $CO_2$ and CO [6]. The employment of $Ni/Al_2O_3$ catalyst for ethanol steam reforming, coming from its satisfactory performances for methane reforming and its C—C bond breaking activity promoted by Ni, is generally not advised due to the support acidic sites which promote the formation of ethylene, a well-known coke precursor [7]. Furthermore, Ni-based catalysts, despite their lower cost with respect to precious metals, suffer for deactivation, apart from coke formation, also owing to sintering of metallic particles. Conversely, $Al_2O_3$ modification by the addition of several metals (Mg, Ca, Ba, Zn, Sr) was shown to reduce carbon deposition. $La_2O_3$, $CeO_2$ and $ZrO_2$ were also employed as promoters. For example, the addition of $CeO_2$ and $La_2O_3$ to $Ni/Al_2O_3$ catalysts, in fact, reduced carbon formation rate of almost 60%, however still remaining in a range not acceptable for long term stability. Rare earth metals oxides, in fact, were shown to be promising supports for ethanol steam reforming due to their oxygen storage-release properties as well as high oxygen mobility, which enhance coke gasification reactions. A similar trend was also observed by employing noble metals as active species: the choice of $CeZrO_2$ as support instead of $Al_2O_3$ for Rh-based catalysts lowered the amount of deposited coke from 10.6 to 6.8 mmol $g_{catalyst}^{-1}$ at 600° C. [8]. Also in this case, however the deposited coke still remains in a range not acceptable for long term stability.

The hindering of carbon formation can also be achieved by the addition of a second metal that can induce significant changes in the catalytic properties of the final system. The co-impregnation of Co and Ni on alumina was shown to improve metals dispersion thus resulting in coke formation rate reduction [9]. Likewise, the stability performances of Rh—Ni/$CeZrO_2$ co-impregnated catalysts were strongly enhanced (the time-on-stream assuring stable behaviour, despite ethanol conversion was lower than 100%, was quadrupled) with respect to the results recorded over the Rh-free samples [10]. Bimetallic $LaNi_{1-x}Co_xO_3$ perovskites supported over $ZrO_2$ displayed total ethanol conversion at 650° C. for 50 h resulting, however, in a not negligible coke deposition on catalytic surface, as confirmed by the weight loss (almost 30%) observed during thermo-gravimetric measurements [11]. Better results in terms of coke formation rates were also found for bimetallic PtCo and PtNi catalysts supported over $CeO_2$ even if the formation of coke cannot be eliminated and accordingly the catalyst stability still results affected [12].

From the above discussion, it is evident that several efforts have been made in the past trying to improve the stability of catalyst formulation for ethanol steam reforming process.

However, despite the huge amount of work performed in the literature to make the catalyst less prone to deactivation under coke formation, a lack of information about catalyst stability in long term tests is still evidenced, in particular when the operating temperature is below 600° C. and at high ethanol partial pressures. In the low temperature range, in fact, the kinetic mechanisms of carbon gasification are lower, due to the strong dependence of gasification reactions rate from temperature. Moreover, coke conversion reactions are inherently very slow, as these reactions involves two-phases (gas-solid).

Accordingly, it would be desirable to provide a catalyst that is active, selective and stable in the ethanol reforming process in the range of temperature between 300 and 600° C., and at relatively high operating ethanol partial pressures.

SUMMARY OF THE INVENTION

Figure 1:
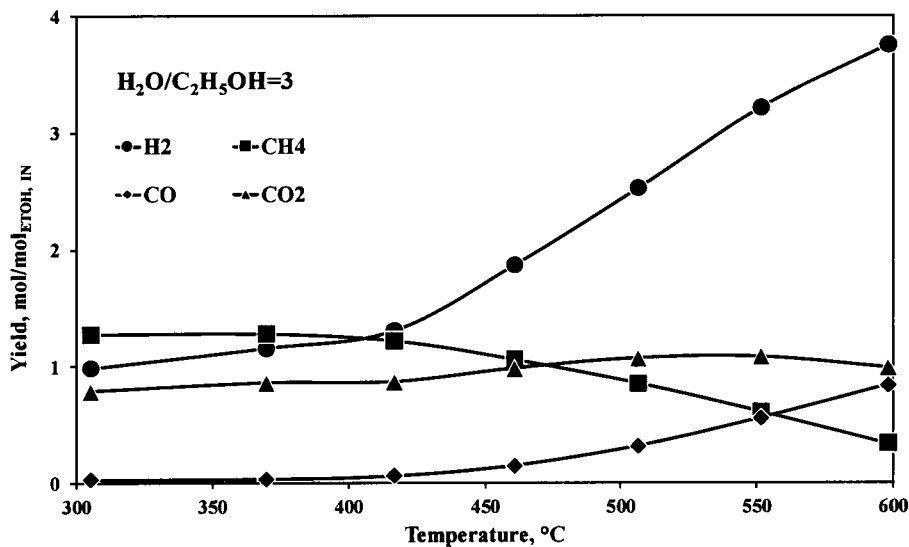
FIG. 1 shows the thermodynamic product distribution in ethanol steam reforming.

In order to better address one or more of the foregoing desires, the invention presents, in one aspect, a catalyst composition suitable for the ethanol reforming process at low temperature with enhanced stability on long term, the catalyst composition comprising a noble metal, such as platinum or rhodium, and a transition non-noble metal, such as nickel or cobalt, supported by a carrier comprising, cerium, zirconium, optionally aluminium, supplemented with potassium.

In another aspect, the invention pertains to a method of making a catalyst as defined above, comprising the step of:
providing an aqueous solution of precursors for potassium promoter, selected from the group consisting of potassium hydroxide, potassium carbonate, potassium chloride, potassium iodide, potassium nitrate, potassium cyanide, potassium sulphate,
wherein a carrier comprising cerium, zirconium and optionally aluminium, is added in order to form a suspension that is further subjected to drying in air flow and calcination in air at 600° C. for 3 hours to enable the formation of potassium oxide on the carrier surface and
providing to the resulting powder from previous steps an aqueous solution of precursors for transition non-noble metals nickel or cobalt, selected from the group consisting of nickel nitrate and nickel nitrate hexahydrate, nickel chloride, nickel acetate tetrahydrate, nickel sulfate, nickel oxalate, nickel acetylacetonate, cobalt chloride hexahydrate, cobalt nitrate hexahydrate, cobalt acetate tetrahydrate, cobalt carbonyl, cobalt sulfate heptahydrate, cobalt acetyl acetonate, cobalt oxalate dehydrate, in order to form a suspension that is further subjected to drying in air flow and calcination in air at 600° C. for 3 hours to enable the formation of transition non-noble metal oxide on the carrier surface and, providing to the resulting powder from previous steps an aqueous solution of precursors for noble metals platinum or rhodium, selected from the group consisting of platinum chloride, chloroplatinic acid hexahydrate, ammonium tetrachloroplatinate, tetraammineplatinum hydroxide hydrate, diammine dinitritoplatinum, Tetraammine platinum nitrate, rhodium nitrate hydrate, rhodium chloride, rhodium chloride hydrate, rhodium acetate, in order to form a suspension that is further subjected to drying in air flow and calcination in air at 600° C. for 3 hours to enable the formation of noble metal oxide on the carrier surface and, providing the resulting powder with a reduction treatment under under a 5% $H_2$ in $N_2$ stream from 25° C. to 600° C. (heating rate of 10° C./rain) and held at the maximum temperature for 1 hour, in order to enable the reduction of both noble metal and transition non-noble metal oxides in the corresponding metallic phase In a still further aspect, the invention provides a method for the stable production of hydrogen from an ethanol containing gas stream, comprising subjecting the gas stream to catalytic ethanol reforming so as to form a rich $H_2$ stream using a catalyst as defined above. The rich $H_2$ stream is further routed to a water gas shift stage for further carbon monoxide conversion to $CO_2$ and production of additional hydrogen, and further routed to an hydrogen separation step, where the methane rich stream purified from hydrogen is routed to a next step of methane steam reforming.

In a still further aspect the invention provides a method for the stable production of an hydrogen from an ethanol containing gas stream, using a catalyst as defined above, wherein if the stream generated in the catalytic ethanol reforming contains mainly hydrogen, methane and CO2, is routed to a next conversion reforming step where methane is converted in additional hydrogen according to reaction (Eq. 1) on traditional nickel based catalysts.

DETAILED DESCRIPTION OF THE INVENTION

The invention, in a broad sense, is based on the recognition of a judicious combination of catalytically active metals, and on using these in the form of a catalyst of the supported type. The metals of choice are rhodium or platinum as noble metal and nickel or cobalt as transition non-noble metal, and the support is a carrier comprising cerium, zirconium and optionally aluminium, with the addition of potassium. A supported catalyst will be understood as pertaining to a catalyst composition comprising a catalytically active part (i.e. particles as provided that are either active, or are converted into an active phase in situ), and a catalytically typically non-active part, wherein the catalytically non active part (the support or carrier) generally forms the majority of the catalyst. This distinguishes a supported catalyst from a bulk-catalyst, in which the catalytically non-active part is generally the minority. Thus, in a supported catalyst, the catalytically non-active part is generally more than 50% by weight of the catalyst composition. Preferably the support or carrier forms more than 60% by weight and more preferably more than 80% by weight of the total catalyst composition.

The catalytically active part of the catalyst composition comprises a noble metal such as platinum or rhodium and a transition non-noble metal such as nickel or cobalt. These metals are typically present in the form of particles dispersed onto the support, in an amount of at least 1 wt. % and generally up to 50 wt. %. The support contains cerium, and will generally be ceria (CeO2) or ceria-zirconia mixed oxide (CeO2-$ZrO_2$). It can contains optionally also alumina (Al2O3). According to a peculiar characteristic of the invention the support contains also potassium, deposited by wet impregnation and generally in the form of potassium oxide and in the amount less than 2 wt %. It should be emphasised that the addition of promoter to the support of a catalyst is well established and known to a skilled person. Indeed the promoter, while maintaining unchanged the role of the support, is able, when added in small quantities, to provide particular chemical interactions metal-support and metal-metal that can result in an overall catalyst improved activity and stability.

In this case, the presence of potassium, with its basic character, can mitigate the action of acidic sites of carrier towards reaction of decompositions that are responsible for coke formation and accordingly catalyst deactivation.

The noble metal more preferably is present in the catalyst composition in a range of from 1 to 50% by weight, most preferably 3% by weight. The transition non-noble metal is present in the catalyst composition in a range of from 1 to 50% by weight, most preferably 10% by weight. The potassium promoter is present in the catalyst composition in a range of from 0.1 to 20% by weight, most preferably 1% by weight.

The catalyst may consist essentially of the catalyst composition, i.e. the potassium promoted cerium/zirconium and optionally aluminium-containing carrier, and a mixture of noble metal and transition non-noble metal deposited on the support. If so, the catalyst will generally be in a suitably shaped form, e.g. a powder or a pellet. The catalyst may also, in addition to the catalyst composition comprising a carrier and the active metals, contain a mechanical support structure, i.e. a substrate.

It will be understood that such a substrate is not part of the catalyst composition as defined above, but comes in addition thereto. A substrate may be any structure known in the art as a substrate for catalysts. In one embodiment of the present invention, the substrate may be in the form of beads, pellets, spheres, honeycomb monolith or open cell foams. The substrate may be formed from alumina, silica alumina, silicon carbide, silica, titania, magnesia, calcium oxide, mixtures thereof, or any other suitable material as available in the field of catalyst substrates.

If the catalyst comprises a substrate, then this will typically be coated with the supported catalyst composition of potassium promoted cerium-containing carrier, and a mixture of noble metal and transition non-noble metal according to a procedure well known to a skilled person In a preferred embodiment, the catalytically active metals are in a metallic form both for the transition non noble metals and the noble ones, whereas the potassium is in the oxide form.

The catalyst composition of the invention can be prepared in a manner known to the skilled person. Reference is made, e.g., to "Catalyst Handbook", M. V. Twigg (Ed.), Wolfe Publishing Ltd, 1989 and to "Structured Catalysts and Reactors", A. Cybuldki and J. A. Moulijin (Ed.), Taylor & Francis Group (2005).

In a particularly suitable method, an aqueous solution is provided of a precursor, and dispersing the solution onto a carrier material as defined in claim 1, 2 or 5. Examples of rhodium or platinum containing precursors are platinum chloride, chloroplatinic acid hexahydrate, ammonium tetrachloroplatinate, tetraammineplatinum hydroxide hydrate, diammine dinitritoplatinum, tetraammine platinum nitrate, rhodium nitrate hydrate, rhodium chloride, rhodium chloride hydrate, rhodium acetate.

Examples of nickel or cobalt precursors are nickel nitrate and nickel nitrate hexahydrate, nickel chloride, nickel acetate tetrahydrate, nickel sulfate, nickel oxalate, nickel acetylacetonate, cobalt chloride hexahydrate, cobalt nitrate hexahydrate, cobalt acetate tetrahydrate, cobalt carbonyl, cobalt sulfate heptahydrate, cobalt acetyl acetonate, cobalt oxalate dehydrate.

Preferred are rhodium chloride ($RhCl_3$), platinum chloride ($PtCl_4$), nickel nitrate hex hydrate ($Ni(NO_3)_2 \cdot 6H_2O$), nickel acetate tetrahydrate ($Ni(CH_3COO)_2 \cdot 4H_2O$), cobalt acetate tetrahydrate ($Co(CH_3COO)_2 \cdot 4H_2O$).

Examples of potassium precursors are potassium hydroxide, potassium carbonate, potassium chloride, potassium iodide, potassium nitrate, potassium cyanide, potassium sulphate.

Preferred is potassium hydroxide (KOH).

In a still further aspect, the invention provides a method for the stable production of hydrogen from an ethanol containing gas stream, comprising subjecting the gas stream to catalytic ethanol reforming so as to form a rich H2 stream using a catalyst as defined above.

The catalytic ethanol reforming is conducted in one or more reaction zones, preferably provided in one reaction chamber. Throughout the text the term "chamber" may relate to one or more reaction zones. A reaction chamber is defined as a reactor volume with optionally a catalyst bed. In a single reaction chamber there is only a single type of catalyst.

Typically the reaction chamber is substantially cylindrical and the reactant flow is in the axial direction. If the reaction chamber comprises a catalyst bed, one or more reactions may take place in the axial direction of the gas flow. The type of reactions and the temperature profile established along the catalytic bed depends on the operating conditions at which the reaction is carried out.

The catalytic ethanol reforming is conducted in the presence of steam. The quantity of steam fed to the reactor is selected so as to achieve the optimal steam/ethanol ratios in the feedstock to enhance the yield of the process. Preferably, steam/ethanol ratio in the feedstock should be in the range 2:1-6:1, more preferably in the range 3:1-5:1, still more preferably in the range 4:1-4.5:1. It should be emphasised that the presence of excess steam in the feedstock enables to inhibit carbonaceous compounds formation on the catalyst.

In the preferred embodiment, selected reaction temperature to reduce energy penalty while maintaining an high hydrogen yield are in the range 300-600° C., preferably in the range 450-550° C., still more preferably at 500°.

In the preferred embodiment the ethanol reforming reaction is performed in adiabatic conditions, with the sensible heat of the gaseous mixture flowing across the catalytic bed. The overall difference of temperature between inlet and reactor outlet depends on the heat balance across the catalytic bed, i.e if the overall reaction is exothermic, the reactor outlet temperature will be higher than the temperature at the inlet, whereas if the overall reaction is endothermic, the reactor outlet temperature will be lower than the temperature at the inlet.

Figure 2:
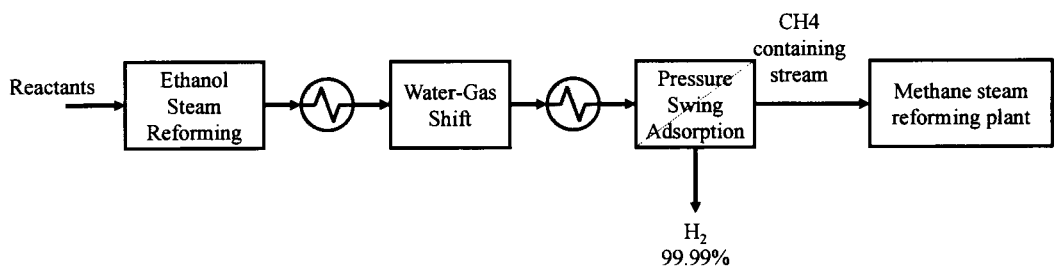
FIG. 2 is a schematic view of the ethanol steam reforming according to a first embodiment of the present invention.

In the preferred embodiment the stream generated in the catalytic ethanol reforming containing mainly hydrogen and CO is routed to a water gas shift stage for the conversion of CO to CO2, followed by a pressure swing adsorption stage (PSA) for high purity hydrogen (>99.99%) production. The methane rich stream from PSA is further routed to a next methane steam reforming plant (FIG. 2)

Figure 3:
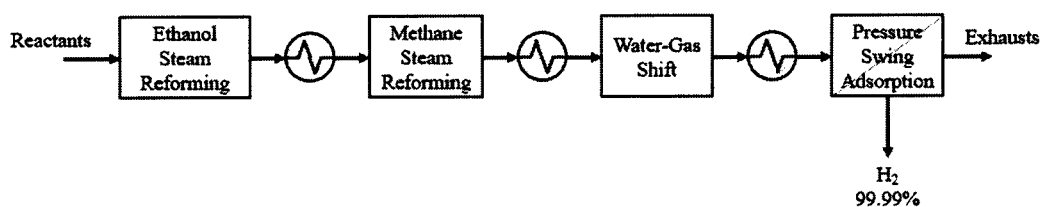
FIG. 3 is a schematic view of the ethanol steam reforming placed upstream to methane steam reforming according to a second embodiment of the present invention.

In another embodiment the stream generated in the catalytic ethanol reforming containing mainly hydrogen, methane and $CO_2$ is routed to a next conversion reforming step where methane is converted in additional hydrogen according to reaction (1) on traditional nickel based catalysts. The hydrogen rich mixture containing also CO is further routed to a water gas shift stage for the conversion of CO to CO2, followed by a pressure swing adsorption stage (PSA) for high purity hydrogen (>99.99%) production (FIG. 3).

Further the invention will be illustrated with reference to the following, non-limiting Examples.

Example 1

Catalyst Preparation Procedure Through Wet Impregnation/Precipitation $CeO_2$ or $CeO_2$—$ZrO_2$ were used as support, after preliminary calcination in air at 600° C. for 3 hours (heating rate 10° C./min) whereas $K_2O$ was added as promoter in order to increase the catalyst stability. To this purpose, as salt precursor of potassium was chosen potassium hydroxide (KOH).

As salts precursors of the active species were chosen platinum chloride ($PtCl_4$), rhodium chloride ($RhCl_3$), nickel nitrate hex hydrate ($Ni(NO_3)_2 \cdot 6H_2O$), nickel acetate tetrahydrate ($Ni(CH_3COO)_2 \cdot 4H_2O$) or cobalt acetate tetrahydrate ($Co(CH_3COO)_2 \cdot 4H_2O$).

The preparation procedure involves the preparation of an aqueous solution of the promoter precursor salt in which the support (20 g) is further dispersed.

The precursor salt of potassium (0.29 g), the amount of which is calculated on the basis of the potassium loading, is dissolved in 250 mL distilled water. After the total dissolution, the support is added to the solution under stirring and heating on a heating plate up to almost total water evaporation. The support is subsequently dried at 120° C. to reach total water evaporation. After the drying procedure the support is calcined in air at 600° C. (heating rate: 10° C./min and isothermal for 3 hours).

In this case, $K_2O$ is formed on surface of the support in well dispersed form to enhance the interaction metal-support.

Next, an aqueous solution of the precursors salts of active species Ni or Co and Pt or Rh was prepared. To this aim, the impregnation is performed in sequence, at first transition metal deposition is performed, soon after the noble metal deposition.

In particular, in the case of Ni as transition metal and Pt as noble metal, the aqueous solution of the nickel precursor ($Ni(CH_3COO)_2 \cdot 4H_2O$) is prepared by dissolving at ambient temperature 9.4 g of the salt in 250 mL of distilled water. After support addition to the as-prepared solution, impregnation is performed on a heated and stirred plate until complete water evaporation. The solid is recovered from the beaker and placed in a drying device (T=120° C.) for 12 h. The resulting sample, in the successive step, is calcined at the conditions described for the support alone. Pt deposition is carried out by the same procedure: 1.2 g of $PtCl_4$, selected as platinum salt precursor, are dissolved in distilled water and, then, the Ni/K—$CeO_2$ solid is added to platinum chloride solution. After water evaporation, drying and calcination occurred.

The catalyst thus obtained has the following nominal loading 3% wt Pt—10% wt Ni/1% wt K—CeO2 where the loading of potassium is calculated as:

K loading=$M_K/(M_K+M_{SUPPORT})$ . . . .

Ni loading=$M_{Ni}/(M_{Ni}+M_K+M_{SUPPORT})$

Pt loading=$M_{Pt}/(M_{Pt}+M_{Ni}+M_K+M_{SUPPORT})$ where $M_x$ refers for the mass of x species.

In order to activate the catalyst and assure the complete reduction of oxidized phases of noble metal and transition non-noble to their corresponding metallic phase, before activity and stability tests, the catalysts are heated under a 5% $H_2$ in $N_2$ stream from 25° C. to 600° C. (heating rate of 10° C./min) and held at the maximum temperature for 1 hour.

Example 2 (Catalytic Activity Tests)

A typical catalytic tests is carried out between 400 and 600° C., at a steam/ethanol molar ratio of 3 and an ethanol partial pressure of 0.05 bar. The catalyst employed was Pt—Ni/$CeO_2$—$ZrO_2$ and the space velocity (GHSV), defined as the ratio between the total volumetric flow-rate and the catalytic volume, was fixed to 15000 and 100000 $h^{-1}$. Results are shown in FIG. 4.

Figure 4:
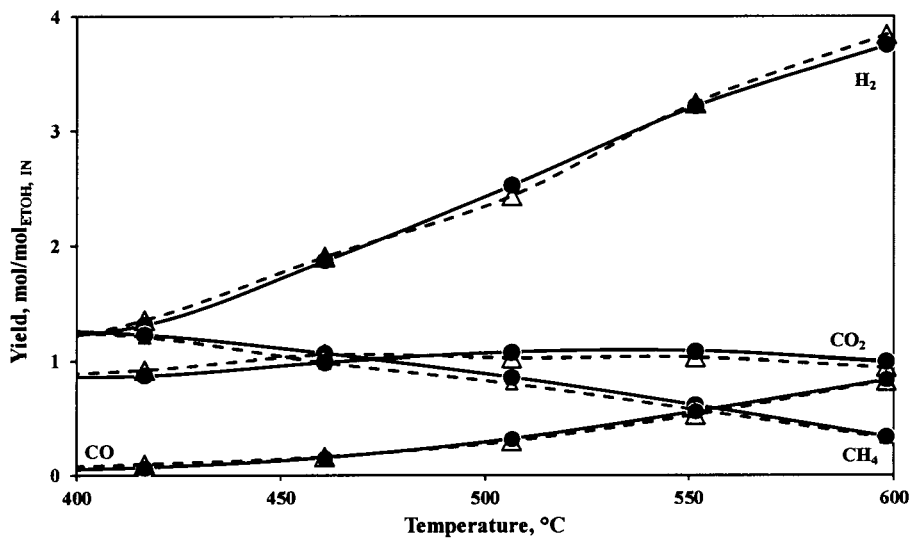
FIG. 4 shows the results of a typical catalytic activity test carried out between 400 and 600° C.

FIG. 4 summarizes graphs which compares the yield of the different reaction products obtained at 15000 and 100000 $h^{-1}$ (steam to ethanol molar ratio was fixed to 3 in both cases). The only species recorded in the reforming mixture were $H_2$, $CH_4$, CO, $CO_2$ and water while ethanol was completely converted, independently from contact time. It is also interesting to observe that the increase of space velocity had a negligible effect on product yield. In particular, hydrogen production rate, at fixed temperatures, was almost the same in the two cases.

Example 3 (Catalyst Stability)

The stability of the catalyst is reported adopting a particular parameter indicated as the carbon formation rate CFR, that is defined as the ratio between the mass of coke ($g_c$) and the product of the carbon mass fed during the test ($g_{c,fed}$), the catalytic mass ($g_{cat}$) and fed) the time-on-stream in hours.

Figure 5:
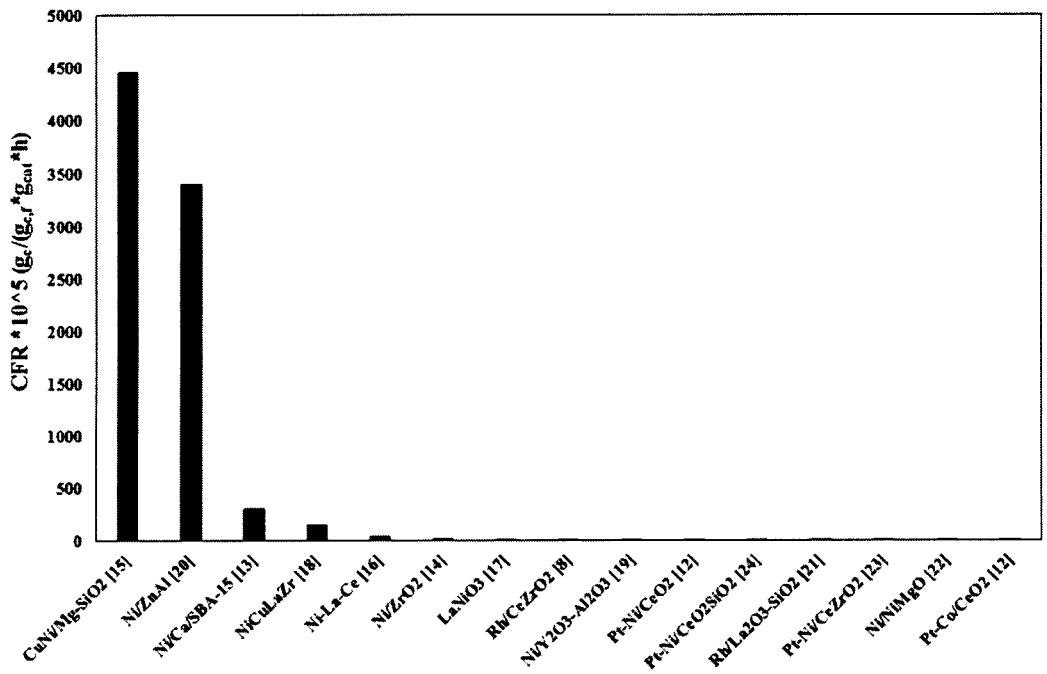
FIG. 5 shows the carbon formation rate (CFR) in the state of the art.

In order to make understand the improved stability of the catalyst, a figure (FIG. 5) summarising the carbon formation rate in the state of the art and a table (Table 1) reporting the comparison with the novel catalyst formulation including potassium are reported.

Table 1. Carbon Formation Rate (CFR) for Improved Catalyst Formulation

| Sample | Temperature (° C.) | CFR ($g_c/(g_{c,f} * g_{cat} * h)$) |
|---|---|---|
| Pt—Co/$CeO_2$ | 600 | $3.9 * 10^{-5}$ |
| Pt—Co/K/$CeO_2$ | 600 | $2.4 * 10^{-5}$ |
| Pt—Co/$CeO_2$ | 300 | $4.9 * 10^{-5}$ |
| Pt—Co/K/$CeO_2$ | 300 | $2.0 * 10^{-5}$ |

A sensible reduction of CFR with K addition was observed; the beneficial effect of K presence appeared more pronounced at lower temperature. In fact, potassium lowered the carbon formation rate of almost 40% at 600° C. and 60% at 300° C. Despite, under a thermodynamic point of view, carbon selectivity increases with temperature reduction, K addition was able to reduce coke yield. The showed results suggest that potassium presence as support promoter probably increased kinetics of coke gasification, leading to an overall improved coke resistance, thus suggesting a longer catalyst lifetime.

REFERENCES

1. Chi-Shen Lee "Ethanol reforming catalyst composition and method of producing ethanol reforming catalyst". No. US 2014/0213440 A1, Jul. 31, 2014.
2. J. L. Contreras, J. Salmones, J. A. Colin-Luna, L. Nuno, B. Quintana, I. Cordova, B. Zeifert, C. Tapia, G. A. Fuentes, Int. J. Hydrogen Energy 39 (2014) 18835-18853.
3. A. L. A. Marinho, R. C. Rabelo-Neto, F. B. Noronha, L. V. Mattos, Appl. Catal. A: Gen. 520 (2016) 53-64.
4. J. Vicente, J. Erena, C. Montero, M. J. Azkoiti, J. Bilbao, A. G. Gayubo, Int. J. Hydrogen Energ. 39 (2014) 18820-18834.
5. V. Nichele, M. Signoretto, F. Pinna, F. Menegazzo, I. Rossetti, G. Cruciani, G. Cerrato, A. Di Michele. Appl. Catal. B: Environ. 150-151 (2014) 12-20.
6. P. Ciambelli, V. Palma, A. Ruggiero. Appl. Catal. B: Environ. 96 (2010) 190-197
7. P. Osorio-Vargas, N. A. Flores-González, R. M. Navarro, J. L. G. Fierro, C. H. Campos, P. Reyes, Catal. Today 259 (2015) 27-38.
8. P. K. Sharma, N. Saxena, P. Kumar Roy, A. Bhatt, Int. J. Hydrogen Energ. 41 (2016) 6123-6133.
9. X. Zhao, G. Lu, Int. J. Hydrogen Energ. 41 (2016) 3349-3362.
10. J. Y. Z. Chiou, C. L. Lai, S.-W. Yu, H.-H. Huang, C.-L. Chuang, C.-B. Wang, Int. J. Hydrogen Energ. 39 (2014) 5653-5662.
11. L. Zhao, T. Han, H. Wang, L. Zhang, Y. Liu, Appl. Catal. B: Environ. 187 (2016) 19-29.
12. V. Palma, F. Castaldo, P. Ciambelli, G. Iaquaniello, Appl. Catal. B: Environ. 145 (2014) 73-84.
13. A. J. Vizcaino, A. Carrero, J. A. Calles. Fuel Process. Technol. 146 (2016) 99-109.
14. I. Rossetti, J. Lasso, V. Nichele, M. Signoretto, E. Finocchio, G. Ramis, A. Di Michele. Appl. Catal. B: Environ. 150-151 (2014) 257-267.
15. A. Carrero, J. A. Calles, A. J. Vizcaíno. Chem. Eng. J. 163 (2010) 395-402.
16. F. Liu, L. Zhao, H. Wang, X. Bai, Y. Liu. Int. J. H. Energ. 39 (2014) 10454-10466.
17. K.-H. Lin, C.-B. Wang, S.-H. Chien. Int. J. Hydrogen Energ. 38 (2013) 3226-3232.
18. J. Bussi, M. Musso, S. Veiga, N. Bespalko, R. Faccio, A.-C. Roger. Catal. Today 213 (2013) 42-49.
19. H. Ma, R. Zhang, S. Huang, Chen W., Q. Shi. J. Rare Earths 30 (2012) 683-690.
20. A. J. Vizcaino, M. Lindo, A. Carrero, J. A. Calles, Int. J. Hydrogen Eneg. 37 (2012) 1985-1992.
21. L. Coronel, J. F. Múnera, A. M. Tarditi, M. S. Moreno, L. M. Cornaglia, Appl. Catal. B: Environ. 160-161 (2014) 254-266
22. M. Li, S. Li, C. Zhang, S. Wang, X. Ma, J. Gong. Int. J. Hydrogen Energ. 36 (2011) 326-332.
23. V. Palma, C. Ruocco, A. Ricca, Ceramic foams coated with Pt—Ni/$CeO_2$—$ZrO_2$ for bioethanol steam reforming. In press on International Journal of Hydrogen Energy.
24. V. Palma, C. Ruocco, E. Meloni, A. Ricca, Activity and stability of novel silica-based catalysts for hydrogen production via oxidative steam reforming of ethanol. Submitted to Chemical Engineering Transactions.

The invention claimed is:

1. A catalyst suitable for the steam reforming of an ethanol gas stream, the catalyst comprising a mixture of a noble metal and a transition non-noble metal supported by a carrier comprising cerium, zirconium, and potassium, obtained through a process comprising the steps of:
   providing an aqueous solution of precursors for potassium promoter, selected from the group consisting of potassium hydroxide, potassium carbonate, potassium chloride, potassium iodide, potassium nitrate, potassium cyanide, and potassium sulphate,
      wherein a carrier comprising cerium and zirconium is added in order to form a suspension that is further subjected to drying air flow and calcination in air at 600° C. for 3 hours to enable the formation of potassium oxide on the carrier surface,
   providing to the resulting powder from previous steps an aqueous solution of precursors for transition non-noble metals nickel or cobalt, selected from the group consisting of nickel nitrate and nickel nitrate hexahydrate, nickel chloride, nickel acetate tetrahydrate, nickel sulphate, nickel oxalate, nickel acetylacetonate, cobalt chloride hexahydrate, cobalt nitrate hexahydrate, cobalt acetate tetrahydrate, cobalt carbonyl, cobalt sulphate heptahydrate, cobalt acetyl acetonate, cobalt oxalate dehydrate, in order to form a suspension that is further subjected to drying in air flow and calcination in air at 600° C. for 3 hours to enable the formation of transition non-noble metal oxide on the carrier surface, and
   providing to the resulting powder from previous steps an aqueous solution of precursors for noble metals platinum or rhodium, selected from the group consisting of platinum chloride, chloroplatinic acid hexahydrate, ammonium tetrachloroplatinate, tetraammineplatinum hydroxide hydrate, diammine dinitritoplatinum, tetraammine platinum nitrate, rhodium nitrate hydrate, rhodium chloride, rhodium chloride hydrate, rhodium acetate, in order to form a suspension that is further subjected to drying in air flow and calcination in air at 600° C. for 3 hours to enable the formation of noble metal oxide on the carrier surface,
   the process further comprising an activation step of the catalyst, also assuring the complete reduction of oxidized phases of noble metal and transition to their corresponding metallic phase, before activity and stability tests, according to which the catalyst is heated under a 5% $H_2$ in $N_2$ stream from 25° C. to 600° C., with a heating rate of 10° C./min, and held at the maximum temperature for 1 hour.

2. Catalyst according to claim 1 wherein the carrier additionally comprises aluminum.

3. Catalyst according to claim 1, wherein the noble metal is present in the catalyst in a range of from 1 to 50% by weight.

4. Catalyst according to claim 1, wherein the transition non-noble metal is present in the catalyst in a range of from 1 to 50% by weight.

5. Catalyst according to claim 1, wherein the potassium is present in the catalyst in a range of from 0.1 to 20% by weight.

6. Catalyst according to claim 1, wherein the transition non-noble metal is selected from the group consisting of Ni, Co, Cr, Mn, Fe, Mo, Re.

7. Catalyst according to claim 1, wherein the catalyst is deposited on a structured substrate in the form of beads, pellets, spheres, honeycomb monolith, open cell foams.

8. Catalyst according to claim 1, wherein the noble metal is present in the catalyst in an amount of 3% by weight.

9. Catalyst according to claim 1, wherein the transition non-noble metal is present in the catalyst in an amount of 10% by weight.

10. Catalyst according to claim 1, wherein the potassium is present in the catalyst in an amount of 1% by weight.

11. A method for producing hydrogen from an ethanol gas stream, comprising:
   subjecting the ethanol gas stream to catalytic ethanol steam reforming in the presence of the catalyst according to claim 1 so as to form a stream containing $H_2$;
   routing said stream containing $H_2$ to a water gas shift stage for further carbon monoxide conversion to $CO_2$ and production of additional hydrogen;
   routing the stream containing $H_2$ coming from the water gas shift stage to a purification stage for high purity hydrogen production; and
   routing the stream from the purification stage to a methane steam reforming plant, to obtain other hydrogen.

12. The method according to claim 11, wherein subjecting the ethanol gas stream to the catalytic ethanol steam reforming is conducted with a steam/ethanol ratio between 2:1 and 6:1.

13. The method according to claim 11, wherein subjecting the ethanol gas stream to the catalytic ethanol steam reforming is conducted at a temperature between 300 and 600° C.

14. The method of claim 11, wherein subjecting the ethanol gas stream to the catalytic ethanol steam reforming is carried out at a pressure between 10 and 30 bar.

15. The method according to claim 11, wherein:
   if the stream containing $H_2$ formed by subjecting the ethanol gas stream to the catalytic ethanol steam reforming consists essentially of hydrogen, methane and $CO_2$:
      the stream containing $H_2$ is routed to a next conversion reforming step, wherein the methane is converted in a hydrogen in steam methane reforming reaction on nickel based catalysts; and
      the stream containing $H_2$ is further routed to a water gas shift stage for conversion of CO to $CO_2$, followed by a purification step for high purity hydrogen (>99.99%) production.

16. The method according to claim 12, wherein the steam/ethanol ratio is between 3:1 and 5:1.

17. The method according to claim 12, wherein the steam/ethanol ratio is between 4:1 and 4.5:1.

18. The method according to claim 13, wherein the temperature is between 450 and 550° C.

19. The method according to claim 13, wherein the temperature is 500° C.

20. The method according to claim 14, wherein the pressure is between 15 and 25 bar.

21. The method according to claim 14, wherein the pressure is 20 bar.

* * * * *